United States Patent [19]

Farrelly et al.

[11] Patent Number: 4,576,668
[45] Date of Patent: Mar. 18, 1986

[54] PROCESS OF FORMING A LABELED TAG FOR A GARMENT

[76] Inventors: Susan E. Farrelly; George Spector, both of 233 Broadway RM 3615, New York, N.Y. 10007

[21] Appl. No.: 614,832

[22] Filed: May 29, 1984

[51] Int. Cl.[4] .......................... B32B 31/20; B32B 7/08
[52] U.S. Cl. .......................................... 156/93; 2/244; 156/220; 156/579; 156/583.9; 428/102
[58] Field of Search .......................... 2/244, 246, 275; 156/93, 579, 583.8, 583.9, 219, 220; 219/243; 428/102

[56] References Cited

U.S. PATENT DOCUMENTS

| | | | |
|---|---|---|---|
| 2,610,137 | 9/1952 | Williamson et al. | 156/579 |
| 2,759,090 | 8/1956 | Frye | 156/579 X |
| 3,123,510 | 3/1964 | Dolman et al. | 156/226 X |
| 3,537,194 | 11/1970 | Engle | 428/103 X |
| 3,906,186 | 9/1975 | Szolis | 156/579 X |

FOREIGN PATENT DOCUMENTS 512162 7/1956 Italy .......................................... 2/246

Primary Examiner—Robert A. Dawson

[57] ABSTRACT

A method of bonding a label to a tag within a garment after the garment is manufactured is provided and consists of placing jaws of a heat activating press tool over the tag having a heat activated bonding agent thereon and the label and squeezing the jaws of the heat activating press tool so that the tag and the label will bond together.

2 Claims, 6 Drawing Figures

U.S. Patent  Mar. 18, 1986  4,576,668
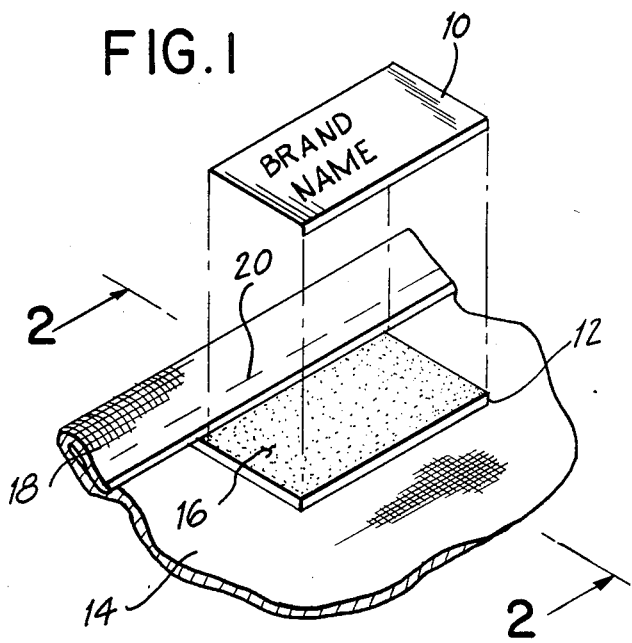
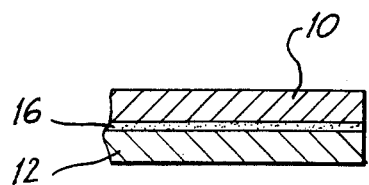
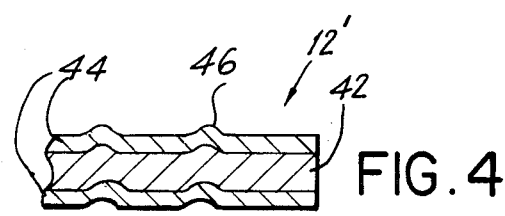
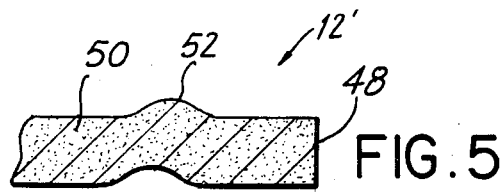
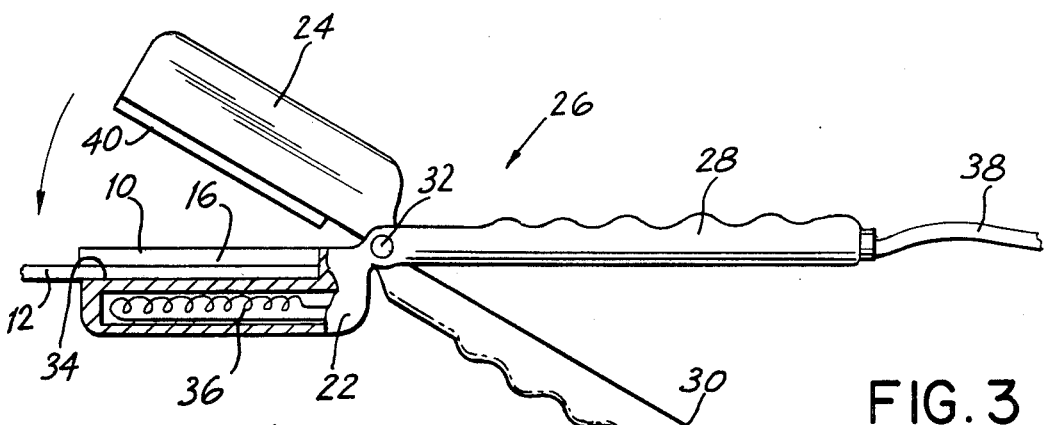
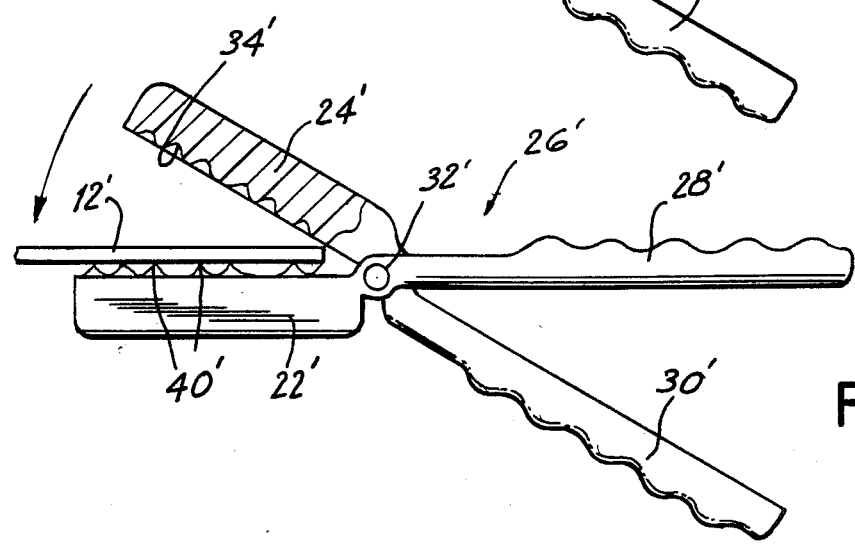

PROCESS OF FORMING A LABELED TAG FOR A GARMENT

BACKGROUND OF THE INVENTION

The instant invention relates generally to tools for applying heat and pressure to work pieces and more specifically it relates to a labeling device for garments.

Numerous tools have been provided in prior art that are adapted to apply heat and pressure to work pieces. For example U.S. Pat. Nos. 1,139,069; 2,535,171 and 2,711,469 all are illustrative of such prior art. While these units may be suitable for the particular purpose to which they address, they would not be suitable for the purposes of the present invention as heretofore described.

SUMMARY OF THE INVENTION

A principal object of the present invention is to provide a method of bonding a label to a tag within a garment after the garment is manufactured.

Another object is to provide a heat activating press tool for bonding the label to the tag within the garment after the garment is manufactured.

An additional object is to provide a method of forming a label from a pliable tag within a garment after the garment is manufactured.

A further object is to provide a pressure press tool for forming a label from a pliable tag within a garment after the garment is manufactured.

A still further object is to provide a labeling device that is simple to use and economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a tag attached to a garment with a label ready to be placed thereon.

FIG. 2 is a cross sectional view taken along line 2—2 in FIG. 1 showing the label attached to the tag.

FIG. 3 is a side view with parts broken away of a heat activating press tool.

FIG. 4 is a cross sectional view of a first modification showing the tag being a strip of cloth material having two strips of soft plastic material coated thereto.

FIG. 5 is a cross sectional view of a second modification showing the tag being a strip of cloth material impregnated with soft plastic particles.

FIG. 6 is a side view with parts broken away of a pressure press tool used with the tags shown in FIGS. 4 and 5.

DETAILED DESCRIPTION OF THE PREFERRED EMBODIMENTS

Turning now descriptively to the drawings, in which similar reference characters denote similar elements throughout the several views, FIGS. 1 through 3 illustrates a method of bonding a label 10 to a tag 12 within a garment 14 after the garment is manufactured.

The tag 12 has a heat activated bonding agent 16 thereon and is sewn into an inside seam 18 of the garment 14 at 20 with the heat activated bonding agent 16 facing outwards. The label 10 is placed over the tag 12.

Jaws 22 and 24 of a heat activating press tool 26 are placed over the tag 12 and the label 10. The jaws are then squeezed so that the tag and the label will bond together.

The heat activating press tool 26 consists of a pair of handle portions 28 and 30 crossing each other and mutually pivoted with a pin 32. Jaw 22 is rigidly attached to the handle portion 28 while jaw 24 is rigidly attached to the handle portion 30. Jaw 22 has a depression 34 to receive the tag 12 and the label 10. Jaw 22 is electrically heated by a heating coil 36 and a wire 38 extending through the handle portion 28. Jaw 24 has an impression 40 to press together the tag 12 and the label 10. Jaw 24 is heated indirectly by conduction from jaw 22 during use of the tool 26 when the jaws are in a closed position.

FIG. 6 illustrates another method of forming a label from a pliable tag 12' within a garment after the garment is manufactured. The pliable tag 12' is sewn into an inside seam of a garment the same as the tag 12 in FIG. 1.

Jaws 22' and 24' of a pressure press tool 26' are placed over the tag 12'. The jaws are then squeezed so that the tag 12' will take indentations from the jaws 22' and 24' of the pressure press tool to form the label. The indentations can be embossed letters, symbols or the like.

The pressure press tool 26' consists of a pair of handle portions 28' and 30' crossing each other and mutually pivoted with a pin 32'. Jaw 22' is rigidly attached to the handle portion 28' while jaw 24' is rigidly attached to the handle portion 30'. Jaw 22' has a series of impressions 40' and jaw 24' has a series of depressions 34' so that when the tag 12' is placed between the jaws and the jaws are squeezed together the tag will form the label.

FIG. 4 shows the pliable tag 12' consisting of a strip of cloth material 42 and two strips of soft plastic material 44, 44. Each strip of soft plastic material 44 is coated to one surface of the strip of cloth material 42 to hold indentations 46 made by the pressure press tool 26'.

FIG. 5 shows the pliable tag 12' consisting of a strip of cloth material 48 impregnated with soft plastic particles 50 to hold indentation 52 made by the pressure press tool 26'.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A process of forming a labeled tag for a garment comprising the following steps:
    (a) sewing a tag having a heat activated bonding agent thereon along one side into an inside seam of said garment with said heat activated bonding agent facing outwards;
    (b) placing a label over said tag;
    (c) placing jaws of a heating activating press tool over said tag and said label; wherein one of said jaws has a depression to receive said tag, label and the other of said jaws; and (d) squeezing said jaws of said heat activating press tool so that said tag and said label will bond together within said depression to form said labeled tag.

2. A process for forming a labeled tag for a garment comprising the following steps:

(a) sewing said pliable tag into an inside seam of said garment, wherein said tag is formed of plastic impregnated cloth;

(b) placing jaws with mating impressions of a pressure press tool on each side of said tag; and (c) squeezing said jaws of said pressure press tool so that said tag will receive indentations from said impressions of said jaws of said pressure press tool to form said labeled tag.

* * * * *